US 6,457,078 B1

(12) United States Patent
Magro et al.

(10) Patent No.: US 6,457,078 B1
(45) Date of Patent: *Sep. 24, 2002

(54) MULTI-PURPOSE BI-DIRECTIONAL CONTROL BUS FOR CARRYING TOKENS BETWEEN INITIATOR DEVICES AND TARGET DEVICES

(75) Inventors: James R. Magro; Daniel P. Mann, both of Austin, TX (US)

(73) Assignee: Advanced Micro Devices, Inc., Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/334,884

(22) Filed: Jun. 17, 1999

(51) Int. Cl.[7] .................................................. G06F 1/00
(52) U.S. Cl. ........................ 710/105; 710/106; 710/107; 710/110
(58) Field of Search ................................ 710/107, 105, 710/110, 106, 113, 119, 120, 125, 200, 240, 241, 242, 244; 709/201, 203, 207, 209

(56) References Cited

U.S. PATENT DOCUMENTS

| | | | | |
|---|---|---|---|---|
| 5,237,676 A | * | 8/1993 | Arimilli et al. | 710/108 |
| 5,345,562 A | * | 9/1994 | Chen | 710/107 |
| 5,444,847 A | * | 8/1995 | Iisuka | 710/107 |
| 5,600,803 A | * | 2/1997 | Iisuka et al. | 710/107 |
| 5,915,101 A | * | 6/1999 | Kleineberg et al. | 710/107 |
| 6,078,983 A | * | 6/2000 | Hanawa et al. | 710/240 |
| 6,173,349 B1 | * | 1/2001 | Qureshi et al. | 710/110 |

OTHER PUBLICATIONS

*Pentium II® Processor Developer's Manual*, Intel Corporation, Oct. 1997, chapter 3, cover pages and pp. 3–1 through 3–10.

Pentium® II Processor at 350 MHz, 400 MHz and 450 MHz, Intel Corporation, Aug. 1998, cover pages and pp. 74–83.

AMD–K5™ Processor Data Sheet, Advanced Micro Devices, Jan. 1997, cover pages, and pp. 4–14 and 28–40.

Enhanced Am486® DX Microprocessor Family, Advanced Micro Devices, Mar. 1997, Publication #20736, Rev. B, pp. 1–3, 11–38.

* cited by examiner

*Primary Examiner*—Peter Wong
*Assistant Examiner*—Raymond N Phan
(74) *Attorney, Agent, or Firm*—Akin Gump Strauss Hauer & Feld LLP

(57) ABSTRACT

A communication protocol is implemented by a control bus using multi-purpose bi-directional signal lines. The bi-directional signal lines provide a single control path shared among any number of system devices. Tokens, defined by the combination of states of the bi-directional signal lines, are transmitted over the control bus to other system devices. A token can represent a number of control commands. A received token is decoded by a system device using decode logic into an appropriate control command associated with the token according to a predefined logic table. Since a token can represent a control command only originated target devices or a control command only originated by initiator devices, the control bus can support both types of control commands with fewer pincount and point-to-point connections than conventional unidirectional control signalling.

18 Claims, 5 Drawing Sheets

| Control A | Control B | Control C | Decode Meaning |
|---|---|---|---|
| 0 | 0 | 0 | no active signal |
| 0 | 0 | 1 | ADS# |
| 0 | 1 | 0 | BRDY |
| 0 | 1 | 1 | CACHE# |
| 1 | 0 | 0 | BREQ |
| 1 | 0 | 1 | SMIACT# |
| 1 | 1 | 0 | LOCK# |
| 1 | 1 | 1 | INTR |

*FIG. 5*

| Control A | Control B | Device ID | Decode Meaning | |
|---|---|---|---|---|
| | | | Signal | Source Device |
| 0 | 0 | d/c | none | don't care |
| 0 | 1 | 0 | ADS# | Initiator A |
| 0 | 1 | 1 | ADS# | Initiator B |
| 1 | 0 | 0 | CACHE# | Initiator A |
| 1 | 0 | 1 | CACHE# | Initiator B |
| 1 | 1 | 0 | BRDY# | Target A |
| 1 | 1 | 1 | BRDY# | Target A |

*FIG. 6*

MULTI-PURPOSE BI-DIRECTIONAL CONTROL BUS FOR CARRYING TOKENS BETWEEN INITIATOR DEVICES AND TARGET DEVICES

BACKGROUND OF THE INVENTION

1. Field of the Invention

The present invention generally relates to control bus structures, and more particularly to a multi-purpose bi-directional control bus.

2. Description of the Related Art

Control bus structures in hardware have long implemented dedicated unidirectional control signals. Dedicated unidirectional control signals have relied upon point-to-point connections or wiring to form fixed signal paths. While some control signals are only originated by a target or slave device and terminated at an initiator or master device, other control signals are only originated by an initiator or master device and terminated at a target or slave device. Most control signals today fit into one of these two categories. One class of control signals outside of these two categories, however, is control signals originated by initiator devices and terminated at target devices and other initiator devices.

The table below lists some of the control signals associated with the Am486®DX microprocessor family, along with the description and source device for each listed control signal.

| NAME | DESCRIPTION | SOURCE DEVICE |
| --- | --- | --- |
| ADS# | INDICATE VALID ADDRESS | INITIATOR |
| CACHE# | CACHEABLE CYCLE | INITIATOR |
| BREQ | BUS REQUEST | INITIATOR |
| LOCK# | LOCKED BUS CYCLE | INITIATOR |
| SMIACT# | SMM INTERRUPT ACTIVE | INITIATOR |
| W/R# | WRITE/READ | INITIATOR |
| BRDY# | INDICATE VALID DATA | TARGET |
| INTR | MASKABLE INTERRUPT | TARGET |
| NMI | NON-MASKABLE INTERRUPT | TARGET |
| RESET | INITIALIZE INITIATOR | TARGET |
| KEN# | CACHE ENABLE | TARGET |
| SMI# | SMM INTERRUPT | TARGET |

As indicated by the table, each of the signals above is either a unidirectional control signal provided by an initiator device to a target device or a unidirectional control signal provided by a target device to an initiator device.

Due to the specific nature of unidirectional control signals, such control signals have been limited not only in the type of information they carry but also by when they may be utilized. Most unidirectional control signals have only been utilized for a small percentage of a bus cycle or transaction. Many unidirectional control signals therefore have been unutilized during majority of a bus cycle.

Coupling multiple initiator devices to control bus structures has depended upon use of glue logic. Each initiator device has been associated with its own set of dedicated unidirectional control signals. Glue logic has typically served to combine the same control signals from the initiator devices into a common control signal. Multiple sets of glue logic thus have been necessary to generate a common control signal for each dedicated unidirectional control signal shared by any initiator devices.

SUMMARY OF THE INVENTION

Briefly, according to the present invention, a computing or processor-based system, such as a microcontroller, provides a multi-purpose bi-directional control bus between system devices. The control bus can be shared by multiple initiator devices and multiple target devices. An initiator device can transmit a token representing a control command only designated by an initiator device via the control bus to a target device, and a target device can transmit a token representing a control command only originated by a target device via the control bus to an initiator device. A token can represent a number of control commands. A 4-bit control bus, for example, supports 16 possible tokens. Both initiator devices and target devices support encode logic and decode logic to interpret tokens.

The control bus provides bi-directional multi-purpose control lines for carrying tokens. Any control line can provide a token from an initiator device to a target device and provide a token from a target device to an initiator device. As compared to conventional unidirectional control signals, the control bus reduces pincount and point-to-point connections between system devices. Control signals which once were handled using separate control lines can now be handled on a single bi-directional control line. The control bus also provides improved utilization of control lines since its bi-directional control lines may be used for any phases of a bus cycle or transaction.

BRIEF DESCRIPTION OF THE DRAWINGS

A better understanding of the present invention can be obtained when the following detailed description of the preferred embodiment is considered in conjunction with the following drawings, in which:

FIG. 5 is a logic decode table for implementing the communications protocol of the system illustrated in FIG. 3; and FIG. 6 is a logic decode table for implementing the communications protocol of the system illustrated in FIG. 4.

DETAILED DESCRIPTION OF INVENTION

Figure 1:
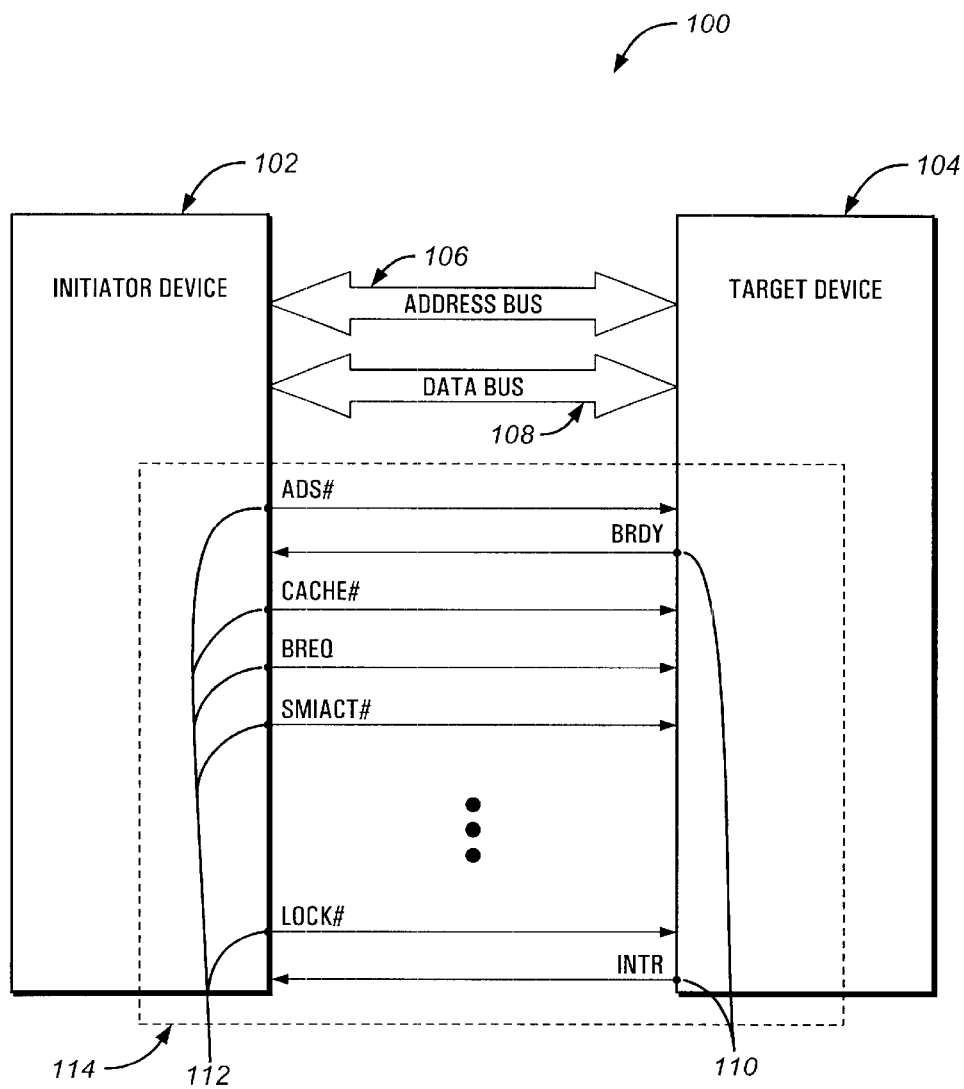
FIG. 1 is a block diagram of an exemplary communications structure of the prior art for a computer system having two communicating devices.

Turning now to the drawings, shown in FIG. 1 is a prior art communication structure for a computer system 100. Communications between an initiator device 102 and a target device 104 is achieved using three bus structures: an address bus 106, a data bus 108, and a control bus 114. Specifically, the control bus 114 is formed of multiple dedicated, unidirectional signal lines. Because of the unidirectional nature of the control bus 114, the signal lines either originate from the initiator device 102 terminating at the target device 104, collectively initiator originating signals 112, or originate from the target device 104 and terminate at the initiator device 102, collectively target originating signals 110. The signals 112 and 110 require point-to-point connections between the communicating devices 102 and 104 which may be implemented as integrated circuits. As such, each control signal requires a dedicated external physical pin on both of the communicating integrated circuits.

Figure 2:
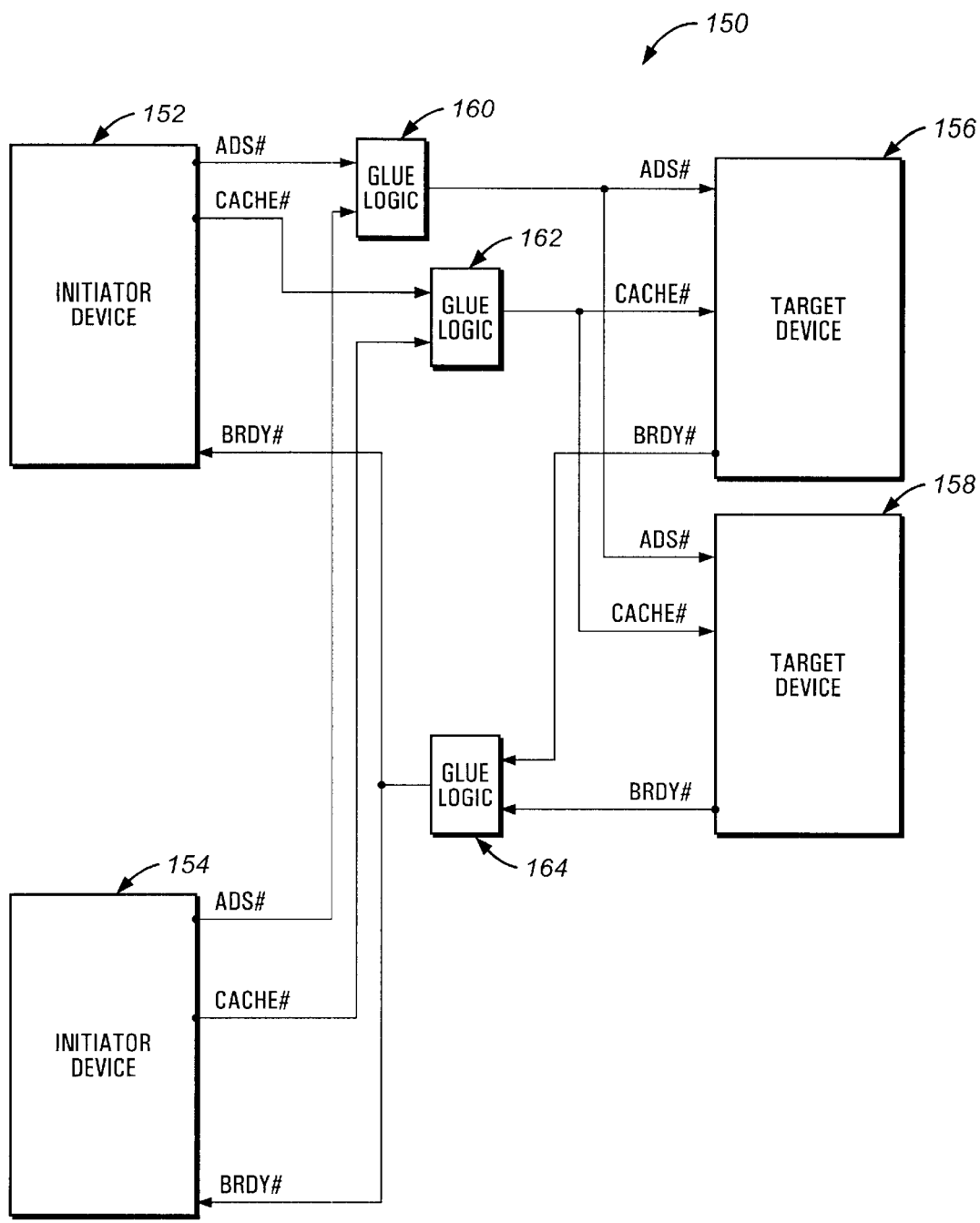
FIG. 2 is a block diagram of an exemplary communications structure of the prior art for a computer system having multiple communicating devices.

FIG. 2 illustrates a prior art communication structure between computer system components in a computer system 150 having multiple devices. As with the two-device system, a prior art control bus structure between multiple computer components is formed of a number of dedicated unidirectional control lines requiring point-to-point connections between the communicating devices. Additionally, glue logic is needed for each dedicated unidirectional control signal, if multiple initiators and/or multiple targets exist. For example, glue logic 160 is needed to generate a common ADS# signal for the ADS# control signal line shared by the first initiator device 152 and the second initiator device 154. Likewise, glue logic 162 is needed to generate a common CACHE# signal for the CACHE# control line shared by the first initiator device 152 and the second shared device 154. Finally, glue logic 164 is needed to generate a common BRDY# signal for the BRDY# control line shared by the first target device 156 and the second target device 158. In this way, independent glue logic is required for each unidirectional control signal originating from an initiator device or a target device (in a system having multiple originating devices). It is noted that the exemplary system shown in FIG. 2 is greatly simplified compared to a typical control bus for ease of understanding. A typical control bus is formed of many dedicated control lines, each additionally requiring the associated glue logic.

Figure 3:
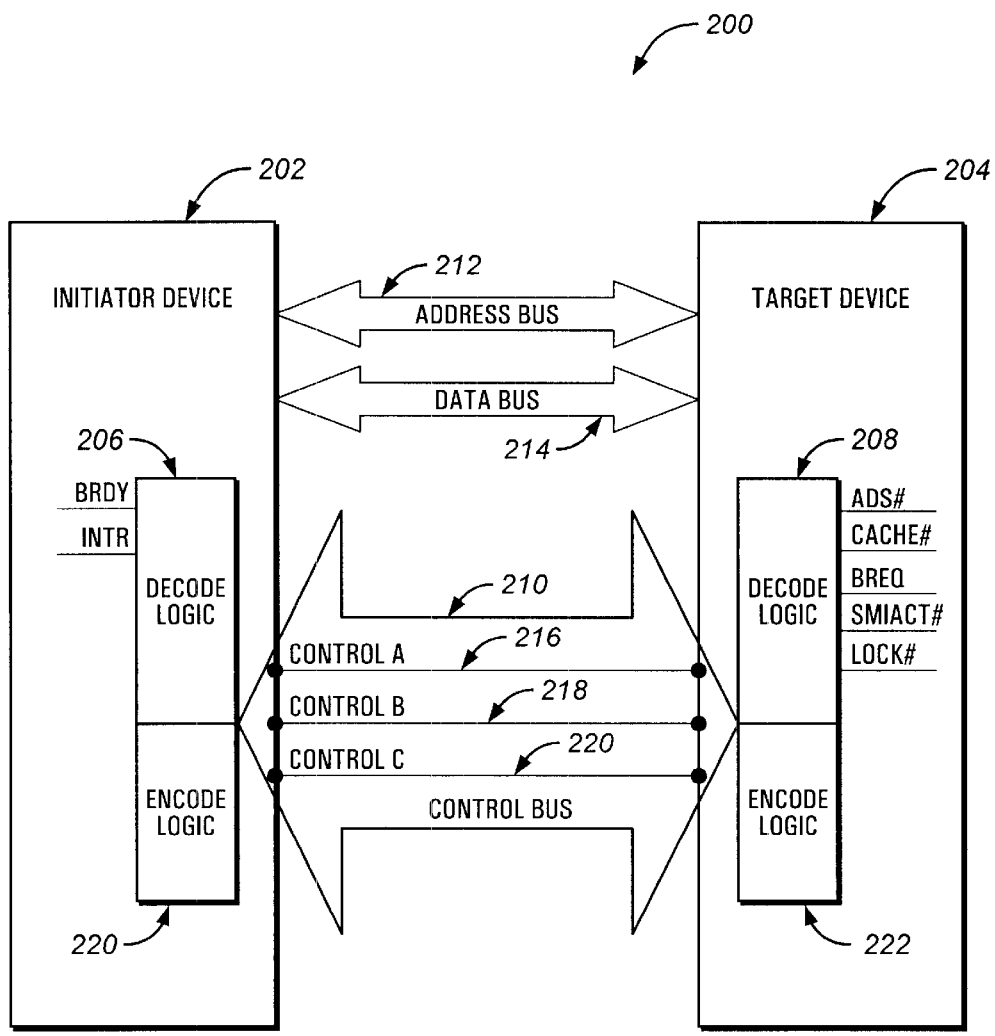
FIG. 3 is a block diagram illustrating a communications bus according to the present invention for the system illustrated in FIG. 1.

FIG. 3 illustrates a computer system according to the present invention, implementing a control bus comprising multiple bi-directional signals. Specifically, a computer system 200 provides communication between an initiator 202 and a target device 204 via an address bus 212, a data bus 214, and a control bus 210. The control bus 210 is a tri-state bus where each signal line has either a high, low or an undefined state or value.

According to an embodiment of the present invention, the control bus 210 is formed of a number of bi-directional control signal lines which communicate command information in the form of tokens. These tokens identify the particular commands being communicated. In the disclosed embodiment, only one token is communicated at a time. Specifically, a token represents the combination of states or values for each signal line of the control bus 210. Decode logic 208 or 206 in either the target device 204 or the initiator device 202 decodes the control command for the control bus 210 from the state information of each signal line as described below in connection with FIG. 5. Encode logic 220 or 222 is used by the token originating device to encode a command to be transmitted into a token representing that command.

The prior art communication system 100 shown in FIG. 1 can be contrasted with the system according to the present invention shown in FIG. 3. Specifically, three bi-directional control signal lines 216, 218 and 220 forming the control bus 210 operate as a transmission path for tokens between an initiator device 202 and a target device 204. The number of control lines to form the control bus 210 can be selected based on the number of control commands to be utilized by the communicating devices. For example, the seven control signals 110 and 112 shown in FIG. 1 according to the present invention can be replaced by the three control lines 216, 218 and 220. Based on the combination of states or values for each of the control lines 216, 218 and 220, the decode logic 206 associated with the initiator device 202, and the decode logic 208 associated with the target device 204, decodes the received token into the appropriate control command represented by that token. The decode logic 206 or 208 associated with each device recognizes only commands that originate from devices of the other type. Commands that are both originated and received by the same device are ignored within that particular device. This prevents a device from responding to its own control command. It is noted that a token can be ignored or masked by a device that originated the token without requiring that the token first be decoded.

The disclosed control bus 210 is advantageous since it supports control commands only originated by target devices and control commands only originated by initiator devices with reduced pincount and point-to-point corrections. Conventional control signalling as seen in FIGS. 1 and 2 has required a point-to-point connection for each unidirectional control signal. By utilizing the disclosed control bus 210 instead, pincount can be saved.

In addition, the special architecture of the control bus 210 can be utilized with a performance tuning protocol based on the token encode/decode logic. For example, the token protocol can be used both, to identify a particular command being transmitted, as described above, and to inform a target device when to respond to a particular command such that the control bus 210 can be 'tuned' for performance by assigning the response, either a command or data, to a particular time slot. The device receiving the response, therefore, is able to 'tune'into the control bus 210 at the specified assigned time slot. In addition, this performance tuning and reconfiguration avoids traditional bus utilization on unidirectional controls signals where such signals have been utilized for only a small percentage of a bus cycle transaction.

For the embodiment shown in FIG. 3, the decode logic 206 and 208 and the encode logic 220 and 222 implement logic that follows the logic table 500 shown in FIG. 5. The logic table 500 may be implemented by either software or hardware using well known techniques. According to the logic table 500 of FIG. 5, the combination of states or values for each of the control lines A, B, and C, 216, 218 and 220, respectively, constitutes a single token. Each token, in turn, represents one of seven control commands and a null, or inactive, command signal. For example, a token having a value of '010' represents that the state of Control A 216 is '0', that the state of Control B 218 is '1' and that the state of Control C 220 is '0'. The originating device via the associated encode logic assigns a token a value that corresponds to the particular command to be transmitted according to the logic table 500. The decode logic 206 or 208 receives the token from the control bus 210. The token is then decoded into its corresponding control command according to the logic table 500. For the example given, a token value of '010,' according to the logic table 500, decodes to the control command BRDY. In addition, since this control command is a target-initiated command, the decode logic 208 of the target device 204 ignores or filters the command.

Returning to FIG. 3, the three bi-directional control signals 216, 218, and 220 take the place of the seven prior art unidirectional control lines 110 and 112 (FIG. 1). In this way, a simplified control bus structure is implemented that reduces the number of external pins required on a given integrated circuit device. In addition, because the control lines according to the present invention are bi-directional, the input/output protocol is universally configurable across all communication pins without specifying whether a particular control signal and its associated communication pin is either an input or output signal.

Although for exemplary purposes only seven control commands are shown in FIGS. 3 and 5, it should be understood that any number of control commands may be implemented according to the present invention. In fact, as the number of control commands required by a system increases, the savings of dedicated control lines and external pins also increases when implemented according to the present invention. In accordance with the present invention, for each additional bi-directional control line, the number of available commands is doubled (less one control command for the "inactive signal" command).

Figure 4:
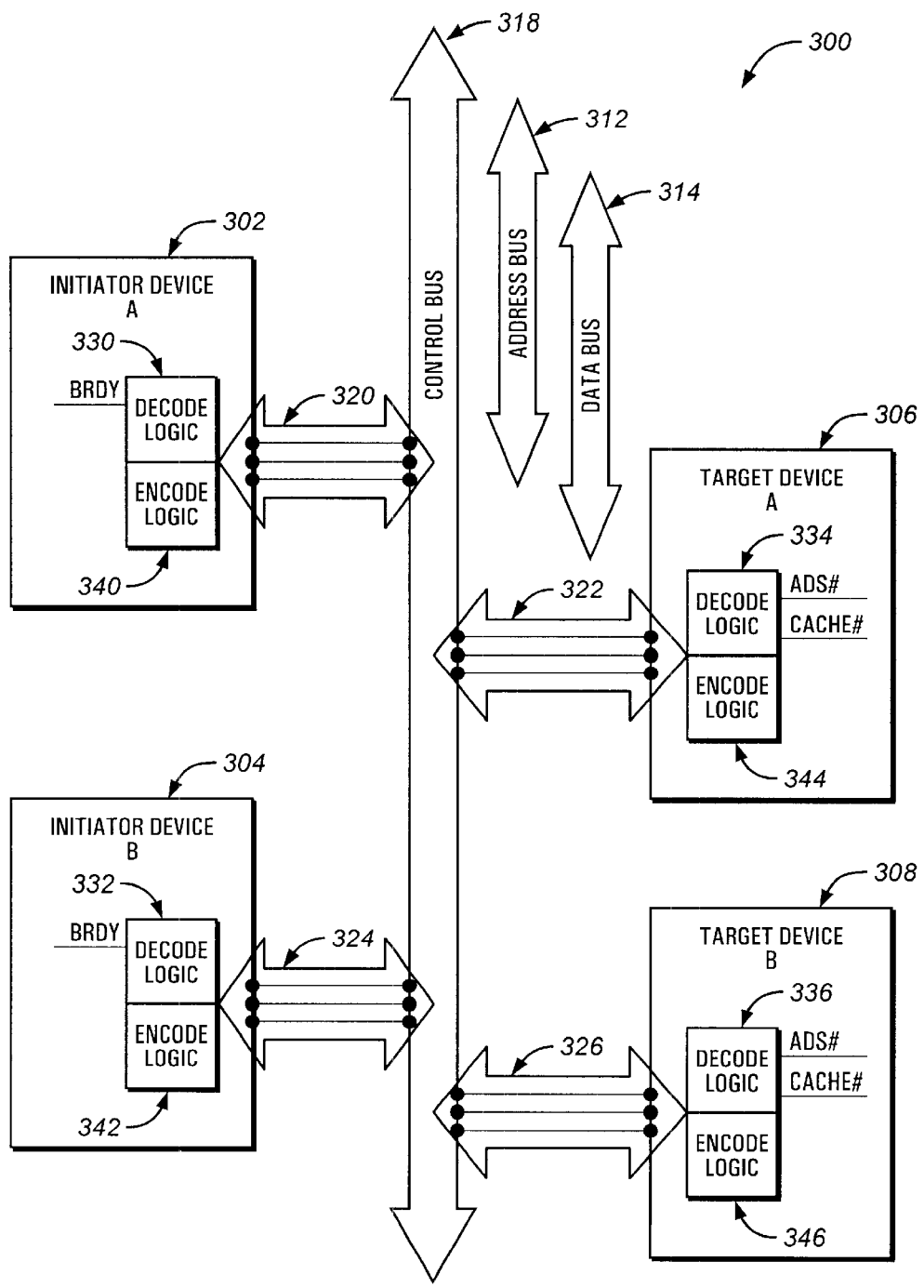
FIG. 4 is a block diagram illustrating a communications bus according to the present invention for the system illustrated in FIG. 2.

Turning to FIG. 4, shown is a communication structure and protocol according to the present invention for a computer system having multiple initiator devices and multiple target devices. Communication is achieved among initiator devices 302 and 304 and target devices 306 and 308 via a control bus 318, an address bus 312 (interconnections not shown for sake of clarity) and data bus 314 (interconnections not shown for sake of clarity). The devices 302–308 are coupled to the control bus 318 via control connection buses 320–326. Each connection bus 320–326 and the control bus 318 is formed of multiple bi-directional control signal lines. As with the control bus 210 (FIG. 3) of the two-device communication structure, the combination of states for the control signal lines within the control bus 318 defines a token. This token is received by the decode logic 330–336 associated with each receiving device 302–308. The decode logic 330–336 then decodes the token to determine its corresponding control command.

Although for exemplary purposes a control signal is shown as decoded in a single transaction or bus cycle from a single token, it should be understood that a control signal may be decoded over a series of tokens transmitted over a series of transactions or bus cycles. Specifically, the number of signal lines within the control bus 210 may be further reduced here a control signal is coded into a series of smaller tokens. Each of the smaller tokens are then decoded in sequence according to a series of reduced signal logic tables. The first token transmitted within a series of tokens according to an embodiment of the present invention, contains a start signal which initiates the sequential decoding process. Subsequent tokens are decoded and accumulated until a stop signal is received from the final token of the series of tokens for the particular command. The final accumulated value is decoded according to a master logic table into the appropriate command.

In the multiple initiator/target embodiment of FIG. 4, bus arbitration, where needed, is performed preferably by either a host processor (not shown) or any other bus controller device (not shown) coupled to the address bus 312, the data bus 314 and the control bust 318 and capable of communicating to each of the initiator and target devices coupled to the bus. Any arbitration protocol or algorithm which either assigns priorities among the devices coupled to the control bus 318 or otherwise arbitrates among conflicting bus requests is suitable.

For exemplary purposes, the computer system 150 shown in FIG. 2 is replaced by a computer system 300 shown in FIG. 4 according to the present invention. According to the computer system 300, the control signals ADS#, CACHE# and BRDY are communicated between the four communicating devices 302–308 using three control lines within the control bus 318 and the connection buses 320–326. The combination of states or values for each of the bi-directional control lines at any given time defines a token. Encode logic 340, 342, 344 or 346 is used by the associated token originating device to encode a command to be transmitted into a token representing that command. The token is decoded by decode logic 330–336 of a receiving device to determine the particular control command represented by the token. The decode device 330–336 for each communication device 302–308 recognizes only the particular control commands that are decoded by that device. Commands that are not decoded by a particular receiving device are ignored by that receiving device. In this way, the decode devices 330–336 need only decode a token from a device initiator that the decode device 330–336 is previously configured to listen for. For example, an initiator device A 302 need only to listen for a BRDY signal from the target device A 306 where the initiator device A 302 has been preconfigured in such a manner.

A logic or truth table 600 used by the decode devices 330–336 and the encode devices 340–346 according to the disclosed embodiment is shown in FIG. 6. In this example, control lines Control A and Control B partially form the control bus 318 and the connection buses 320–326. The cumulative value of these control lines represent the particular control command transmitted. A third control signal line, Device ID, identifies the originating device. According to the logic table 600, when both the control lines Control A and Control B have a zero value or a low state, no control command has been sent and the Device ID control signal line is treated as a don't care value. Digressing downward through the logic table 600, each token represents a particular command according to the combination of states of the control signals Control A and Control B. Each token also identifies the originating device according to the control signal Device ID.

As in the two-device embodiment shown in FIG. 3, the combination of the control bus 318 and connection buses 320–326 shown in FIG. 4 is advantageous since it supports commands originated by both target and initiator devices using a reduced number of signal lines. The reduced number of signal lines results in fewer external pinouts.

In addition, as described above in connection with the multi-device embodiment shown in FIG. 3, the token protocol may be used to both identify a particular command transmitted across the control bus 318 as well as informing a target device when to respond to a particular command such that the control bus 318 may be 'tuned' for performance. Such tuning may be achieved by assigning the response to a control command, either response command or return data, to occur in a particular time slot on the control bus 318. This performance tuning and reconfiguration allows target devices to monitor the control bus 318 during the specified response time. In addition, under-utilization of bus cycles, as occurs in systems with unidirectional control signals, is avoided by preassigning a particular response to a particular time slot.

According to the disclosed embodiment, the conventional prior art utilizing dedicated unidirectional control lines, shown in FIG. 2, are replaced by the control bus 318 containing the bi-directional control lines shown in FIG. 4. In addition, the glue logic devices 160–164 are replaced by a combination of decode logic 330–336, encode logic 340–346 and the bi-directional control line structure of the universal control bus 318. Incorporating the decode logic 330–336 and the encode logic 340–346 as a part of the communicating devices 302–308 keeps all the necessary logic local to the particular device and does not require additional logic on the computer board, such as the glue logic devices 160–164 of the prior art.

Although for exemplary purposes, a specific number of initiator devices and target devices as well as a specific number of command signals are shown in certain figures, it should be understood that any multitude of combinations of control commands as well as any number of initiator devices and target devices can be implemented according to the present invention. In fact, as the number of devices and control commands increase, the complexity of the control bus structure and protocol decreases in comparison to the dedicated unidirectional control lines and glue logic required by conventional control signalling as shown in FIG. 2.

It should also be understood that although a computer system is shown for exemplary purposes, the disclosed communications protocol can be applied to any multitude of processor-based applications to replace unidirectional signal lines that are utilized to transmit commands among system devices.

Thus, in accordance with the present invention, unidirectional control signaling is replaced with a bi-directional control bus representing possible control commands. Use of such a control bus reduces point-to-point connections between system devices, improves utilization of control lines, and eliminates the use of external glue logic in the case of multiple initiator devices. In addition, the token protocol can be used to minimize under-utilization of bus cycles, as in unidirectional control signal applications, by preassigning response commands or data to a particular time slot on the bus.

The foregoing disclosure and description of the preferred embodiment are illustrative and explanatory thereof, and various changes in the components, circuit elements, circuit configurations, bus protocols, bus signals, and signal connections, as well as in the details of the illustrated circuitry and construction and method of operation may be made without departing from the spirit and scope of the invention.

We claim:

1. A processor-based device, comprising:
   at least one initiator device;
   at least one target device; and
   a control bus coupled to the initiator device and the target device, comprising:
   a plurality of bi-directional control lines to transmit tokens between the initiator device and the target device, each control line of the plurality of bi-directional control lines supporting tokens exclusively transmitted from the initiator device to the target device and tokens exclusively transmitted from the target device to the initiator device,
   wherein both the initiator device and the target device comprise decode logic to interpret the tokens.

2. The device of claim 1, wherein each token is defined by a combination of signal states of the plurality of bi-directional control lines.

3. The device of claim 1, further comprising:
   a plurality of initiator devices sharing the control bus.

4. The device of claim 1, further comprising:
   a plurality of target devices sharing the control bus.

5. The device of claim 1, wherein both the initiator device and the target device comprise encode logic to generate the tokens.

6. The device of claim 1, wherein the tokens are identified from the plurality of bi-directional control lines using decode logic.

7. The device of claim 6, wherein the decode logic decodes the tokens into a command.

8. The device of claim 7, wherein the decode logic further decodes the tokens into a device identifier.

9. A method of controlling system devices using a control bus having a plurality of bi-directional control lines for transmitting tokens, comprising the steps of:
   providing a first token over the control bus from an initiator device to a target device; and
   providing a second token over the control bus from the target device to the initiator device; decoding of the first token by the target device; and decoding of the second token by the initiator device.

10. The method of claim 9, each bi-directional control line of the plurality of bi-directional control lines having a high signal state or a low signal state, wherein the providing a first token step comprises the step of selecting a first combination of signal states for the plurality of bi-directional control lines and the providing a second token step comprises the step of selecting a second combination of signal states for the plurality of bi-directional control lines.

11. The method of claim 9, wherein the first token is a control command only originated by an initiator device and terminated by a target device and the second token is a control command only originated by a target device and terminated by an initiator device.

12. The method of claim 9 further comprising steps of:
   encoding of the first token by the initiator device; and
   encoding of the second token by the target device.

13. A method of controlling system devices using a control bus having a plurality of bi-directional control lines for transmitting tokens, comprising the steps of:
   providing a first token over the control bus during a first portion of a transaction, the first token corresponding to a first combination of signal states for the plurality of bi-directional control lines; the control bus being coupled to an initiator device and the target device, wherein the first token and the second token are decoded into commands from the first combination of signal states for the plurality of bi-directional control lines and the second combination of signal states for the plurality of bi-directional control lines respectively.

14. The method of claim 13, the control bus being coupled to an initiator device and a target device, wherein the first token and the second token are provided from the initiator device to the target device.

15. The method of claim 13, the control bus being coupled to an initiator device and a target device, wherein the first token and the second token are provided from the target device to the initiator device.

16. The method of claim 13, the control bus being coupled to an initiator device and a target device, wherein the first token and the second token are control commands only originated by the initiator device and terminated by the target device.

17. The method of claim 13, the control bus being coupled to an initiator device and a target device, wherein the first token and the second token are control commands only originated by the target device and terminated by the initiator device.

18. The method of claim 13, wherein the first token and the second token are further decoded into device identifiers.

* * * * *